April 6, 1965 W. W. BRITT 3,176,929
FISHING REEL WITH MEANS LIMITING UNWINDING
Filed Aug. 1, 1962
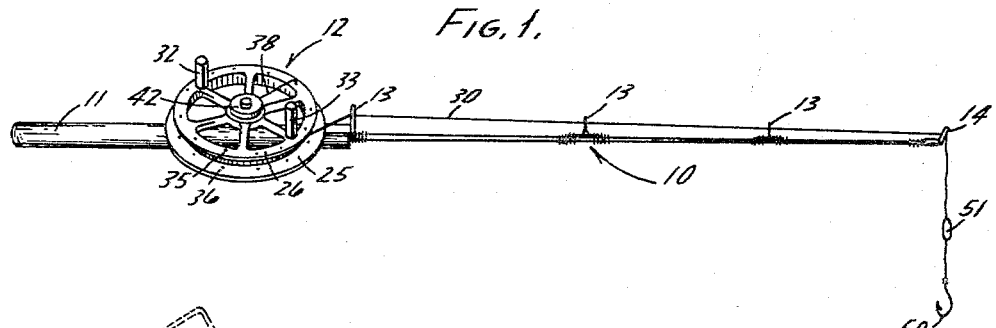
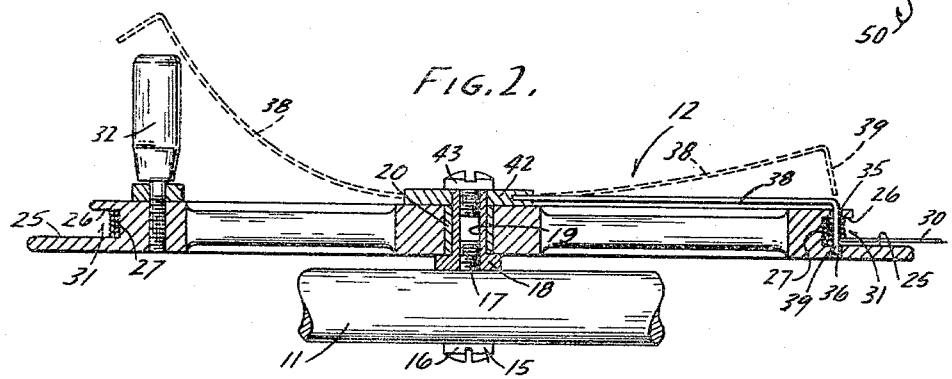
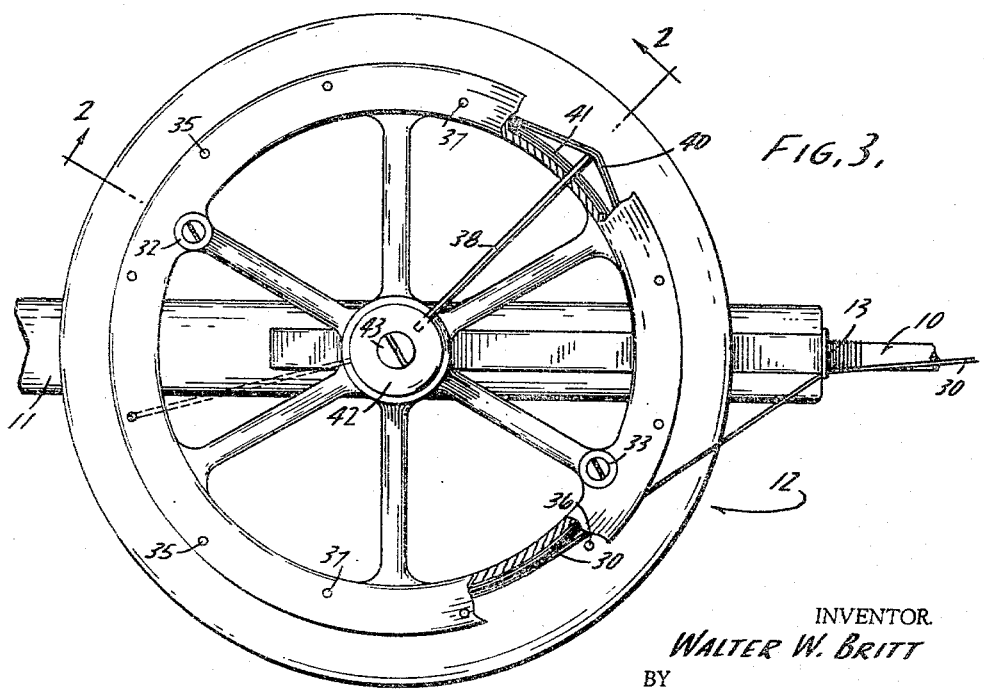
INVENTOR.
WALTER W. BRITT
BY
Wheeler, Wheeler & Wheeler
ATTORNEYS.

United States Patent Office 3,176,929
Patented Apr. 6, 1965

3,176,929
FISHING REEL WITH MEANS LIMITING UNWINDING
Walter William Britt, N. Shore Drive, Box 409, Delavan, Wis.
Filed Aug. 1, 1962, Ser. No. 213,968
3 Claims. (Cl. 242—84.1)

This invention relates to a reel.

More particularly stated, this invention relates to a reel wherein there are channel walls providing a channel for reception of a reeled line or cordage, and these walls are apertured at spaced points whereby to receive a stop projectable through a selected aperture and thus so disposed along a reel channel as to demark a portion of the deeper part of the channel for "stored" line and leave portions of the channel outside the stop for "active" line.

In the drawings:

FIGURE 1 is a perspective of a conventional fishing pole, line and tackle equipped with a reel embodying the invention.

FIGURE 2 is an enlarged sectional view taken on line 2—2 of FIGURE 3; a portion of a fishing pole being shown fragmentarily in elevation.

FIGURE 3 is a plan view of the reel and a portion of the fishing pole adjacent the reel; parts of a side wall of the channel being broken away to show the relation of the stop member to the reel and the line or cordage wound and to be wound on the reel.

There are many occasions when a reel used for fishing or other purposes is supplied with a considerable length of line or cordage wound upon it, but in the active use of the reel only a certain amount of the line is to be actively used; and it is of great assistance to the user to have the active portion of the line demarked from the part which I shall hereinafter refer to as stored line. Such a situation often prevails with respect to the use of a fishing reel. As shown in the drawings, a fishing pole 10 has its usual handle or grip 11 to which a reel 12 is mounted for rotation. Along the fishing pole 10 are spaced guides 13, and annular tip guide 14 at the extreme end of the pole.

Means for mounting the reel rotatably respecting the pole and its handle 11 are shown most clearly in FIGURE 2. A screw 15 with its fillister head at 16 has a threaded shank 17 extending through the pole handle 11 and therebeyond sufficiently to threadedly engage the threaded bore of a shoulder nut 18 which includes a sleeve extension 19. Upon this sleeve extension 19 there is received a bushing 20 and upon this bushing 20 is received the actual reel 12. The bushing 20, in its running fit relationship to the sleeve 19 and running fit within the axial bore of the reel, assures free rotation of the reel.

The reel 12 is peripherally channeled to provide a side wall 25 of considerable radial extent, a side wall 26 spaced therefrom and having lesser radial extent than wall 25, and a bottom wall 27 so disposed with reference to the guides 13 as to receive line 30 which is to be wound upon or payed out from the reel groove 31 in accord with usual fishing reel practices. To facilitate the winding and unwinding operations, a pair of rotatable reel handles 32 and 33 are provided as shown.

Extending through the side walls 25 and 26 of the reel channel 31 are sets of apertures 35 and 36 or 37 so that a spring wire 38, as to stop portion 39, can be inserted in the position shown across the channel as illustrated in FIGURE 2. The apertures through the side walls of the channel are so positioned that the stop portion 39 of spring wire 38 will demark an active portion 40 of the line 30, and a storage portion 41 of the line is disposed between the stop 39 and the bottom of the channel.

The wire 38 is extended into and mounted in radial fixed relation to a swing washer 42 which is mounted for free rotation on the tubular extension 19 of the shoulder nut 18 and is held in position by a fillister head screw 43 in threaded interior engagement with the tubular extension 19. Thus it is possible to swing the wire 38 to any position desired so that the stop portion 39 of wire 38 may be received into any one of the apertures 35 or 37. If a larger amount of active line is to be stored in channel 31, the stop portion 39 of wire 38 will be inserted in one of the apertures such as 37 which is located "deeper" in the channel side wall than are the apertures 35–36.

To illustrate the use of the invention as now described, it will be assumed that a sufficient amount of line is in the channel 31 to comprise a storage length 41 of 140 feet, and an active length 40 of 10 feet; and the stop portion 39 of wire 38 is positioned as shown in the drawings to demark the active portion from the storage portion of the line. The fisherman using this equipment will then have available the 10 feet of active line so that his tackle including fish hook 50 and sinker 51 may be payed out with the 10 feet of line for active fishing purposes at a depth of approximately 7 feet (allowing for the length of the pole). More line than that will not pay out since the stop portion of stop 39 will hold the storage line.

If the fisherman meets conditions calling for a greater length of line, he may withdraw the stop portion 39 of wire 38, as shown in the dotted lines of FIGURE 2, pay out the additional length of line which he desires and reinsert the stop portion 39 of wire 38 in the selected apertures. The free swinging movement of the wire 38 is assured since the swing washer 42 to which the wire is radially fixed is not tightly held by the head of the screw 43. This screw head is seated firmly upon the end of the sleeve-like extension of nut 18, and the washer 42 is sufficiently thinner to permit free movement thereof under the screw head. The washer 42 fitted for a running fit on the outside of the sleeve 19 acts also as a retainer for the bushing 20 and for the reel.

I claim:

1. A reel having a peripheral groove and having an axial aperture therein and a mount therefor, said mount having a shouldered sleeve-shaped nut extending outwardly therefrom and receivable through the axial aperture in the reel, a bushing between the sleeve nut and the reel in position to provide a bearing for reel rotation, a swing washer, a headed screw in threaded engagement with the sleeve nut whereby to hold the swing washer and reel in rotatable relation to each other and to said sleeve nut; and a spring wire fixed to said swing washer, said spring wire having a stop portion receivable in said groove to demark a storage and an active zone.

2. The reel mount of claim 1 wherein the groove of the reel has side walls apertured to receive said stop portion at predetermined depths of the groove.

3. A reel having a cordage-receiving peripheral groove defined by side walls with plural apertures spaced peripherally of the reel and having an axial aperture, apertures at one depth being interspersed with apertures at different depths of the groove, means extending through the axial reel aperture for pivoting the reel for free rotation thereof and including a washer at one end of the means for free rotation of the washer relative to the reel, and a wire mounted on the washer and having a spring portion extending radially of the reel and having a stop portion for entry into the side wall apertures and across the groove, the wire spring portion flexing for entry of the wire stop portion into the deeper side wall apertures and the stop portion defining a storage zone for retention of cordage in the groove and an active zone for unwinding cordage from the reel.

References Cited by the Examiner
UNITED STATES PATENTS

| | | | |
|---|---|---|---|
| 1,331,819 | 2/20 | Matheny | 242—128 |
| 1,898,451 | 2/33 | Kelly | 242—84.1 |
| 2,367,214 | 1/45 | Hedge | 242—96 X |
| 2,397,955 | 4/46 | Fowler | 242—84.2 |

FOREIGN PATENTS 162,389  4/55  Australia.

MERVIN STEIN, *Primary Examiner.*
JOSEPH P. STRIZAK, *Examiner.*